United States Patent [15] 3,703,719

Beyer et al. [45] Nov. 21, 1972

[54] SEQUENCE MATRIX

[72] Inventors: Henry R. Beyer, Chalfont; Thomas F. Long, Warminster; Richard G. DeSipio, Philadelphia, all of Pa.

[73] Assignee: The United States of America as represented by the Secretary of the Navy

[22] Filed: May 31, 1967

[21] Appl. No.: 644,439

[52] U.S. Cl. ........................................340/347 DD
[51] Int. Cl. .......................................H03k 13/243
[58] Field of Search .....................340/347 DD, 172.5

[56] References Cited

UNITED STATES PATENTS

| | | | |
|---|---|---|---|
| 3,172,097 | 3/1965 | Imlay | 340/347 DD |
| 3,562,742 | 2/1971 | Abe | 340/347 DD |

*Primary Examiner*—Benjamin A. Borchelt
*Assistant Examiner*—H. A. Birmiel
*Attorney*—E. J. Brower and Henry Hansen

[57] ABSTRACT

A sequence matrix for decoding *n* binary events each having *m* different states without the need for a clock or a data message preamble. Sequential binary input signals are applied to an input decoder which provides steering signals to a sequence register for storing the sequential information to provide a parallel pure binary word readout. The steering signals are shifted from one storage element in the shift register to another by shift pulses generated from the sequential input signals. A timing circuit triggered by the shift pulses initiates a time gate during which the sequential input signals must be processed or the register will be reset without providing a readout. The decoder readout from the sequence register is displayed on a decoder display.

6 Claims, 3 Drawing Figures

INVENTORS
HENRY R. BEYER
THOMAS F. LONG
RICHARD G. DeSIPIO

By Henry Hanson
Jerome C. Squillaro
ATTORNEYS

INVENTORS
HENRY R. BEYER
THOMAS F. LONG
RICHARD G. DeSIPIO
BY
ATTORNEYS

SEQUENCE MATRIX

The invention described herein may be manufactured and used by or for the Government of the United States of America for governmental purposes without the payment of any royalties thereon or therefor.

BACKGROUND OF THE INVENTION

The present invention relates to data processing and more particularly to a sequence matrix for decoding binary signals.

Various types of data decoders are presently employed in wire-line or radio link communications systems. In general, these decoders require internal clocks or require a data message preamble to initiate decoder operation. One of the basic problems encountered in decoders of this type is that of synchronizing the decoder with the incoming data. Under good signal transmission conditions, such decoders provide generally satisfactory performance; however, if as a result of electrical noise or signal fading, the message preambles are not received by the decoder, then performance of these decoders is considerably deteriorated. To overcome this and other problems of present-day decoders, it is desirable to provide a decoder of simple design which can decode $n$ events each having $m$ different states (where $n$ and $m$ are integers) without the need for an internal clock or a data message preamble.

SUMMARY OF THE INVENTION

The present invention provides a sequenced matrix which is capable of receiving a binary word comprising a sequence of $n$ binary events with each event having $m$ different states and decoding this information for visual or audible display or to provide an output to another system which may depend upon the decoded signal. To attain this, the present invention contemplates an arrangement of an input decoder which receives the sequential input data and provides steering signals to a sequence register. Shift pulses for clocking the steering signals into the appropriate storage element of the register are provided from a shift signal generator which is triggered by the input data. The output of the sequence register is then a parallel binary word which is displayed on a decoder display. A timing control is provided for establishing a desired processing time for decoding the input data after which a clearing signal is sent to the sequence register so that the matrix is ready for the next input sequence. An object of the present invention is therefore to provide a new and improved signal decoder for decoding $n$ sequential binary events each having $m$ different states such that the decoded output has $n^m$ possible combinations in which the need for an internal clock or a data message preamble is eliminated and in which electrical noise signals do not degrade the performance of the matrix. Other objects and many of the attendant advantages of this invention will be readily appreciated as the same becomes understood by reference to the following detailed description when take taken in connection with the accompanying drawing.

DESCRIPTION OF PREFERRED EMBODIMENT

Figure 1:
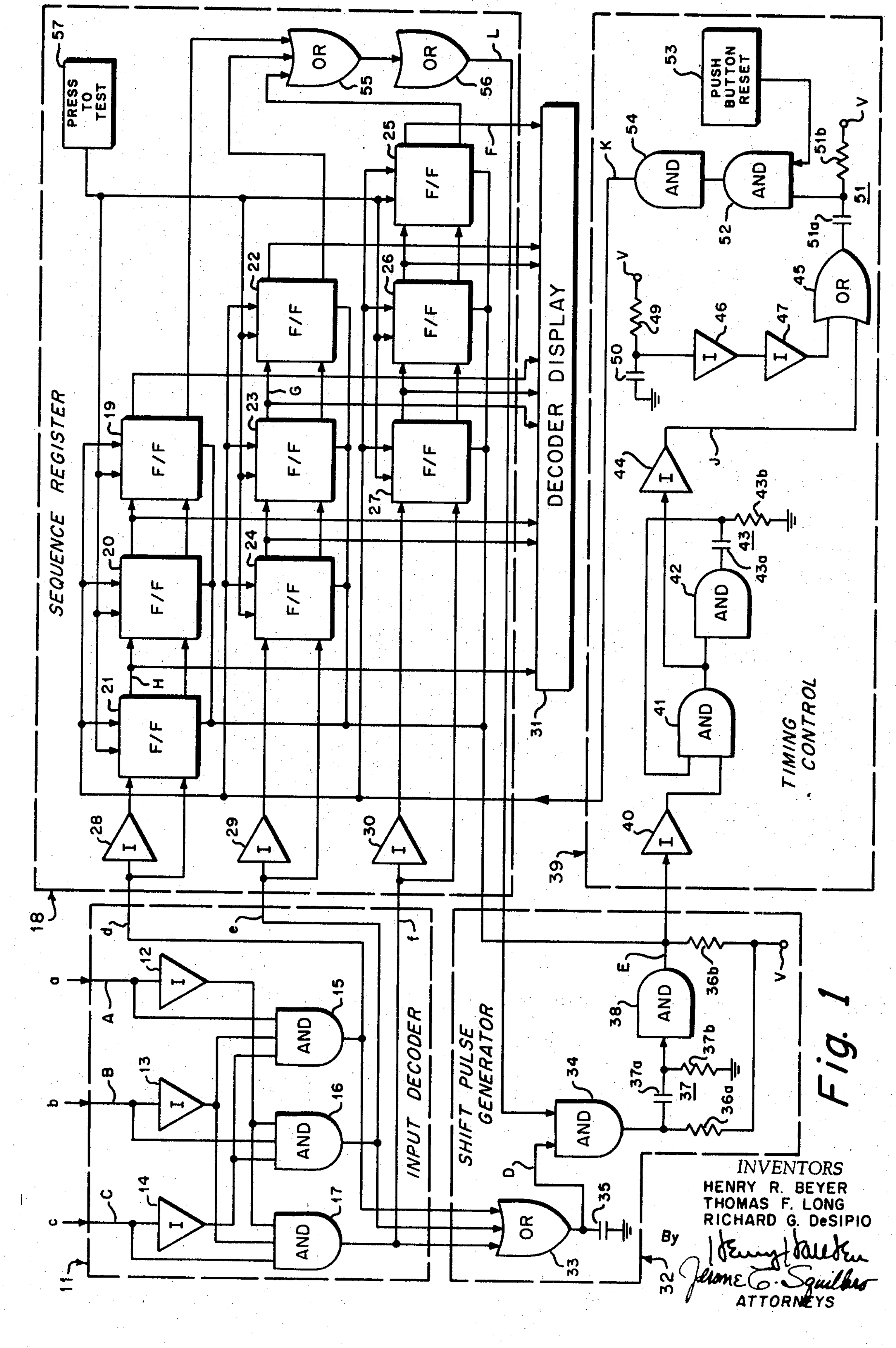
FIG. 1 illustrates a detailed block diagram of a sequence matrix constructed in accordance with the present invention.

Referring now to FIG. 1 of the drawing, there is shown a 3 × 27 sequence matrix in which the number of input lines or events, $n$, equals three and the number of different states for each event, $m$, equals three. Although illustrated as a 3 × 27 matrix, it is to be understood that any size matrix could be constructed in accordance with the following equation:

$$M = n^m \quad (1)$$

where $M$ is the number of possible combinations of $n$ input events having $m$ states.

As shown in FIG. 1, there is an input decoder 11 having three inputs, labeled $a$, $b$ and $c$ and three outputs labeled $d$, $e$ and $f$; the decoder performs the following logic function $$d = a\bar{b}\bar{c} \quad (2)$$

$$e = b\bar{a}\bar{c} \quad (3)$$

$$f = c\bar{a}\bar{b} \quad (4)$$

From the above logic equations, it can be seen that an output will be derived from the input decoder 11 on only one output line during a particular time interval and that to obtain this output there can only be a logical "1" input on one input line during the particular time interval. If more than one logical "1" appears at the same time on the input lines, there will be no output from the input decoder. Accordingly, the function of the input decoder is to provide an output on a particular output line only when a logical "1" appears on a particular input line and logical "0's" appear on the other input lines. This function is performed by three logic inverters 12, 13 and 14 and three three-input AND gates 15, 16 and 17. INput lines $a$, $b$ and $c$ are connected to the inputs of inverters 12, 13 and 14, respectively, and also to one input of each three-input AND gate 15, 16 and 17. The output of inverter 12 is connected to the second inputs of AND gate 16 and 17 and the output of the inverter 13 is connected to the second input of AND gate 15 and the third input of AND gate 17. The output of inverter 14 is connected to the third inputs of AND gates 15 and 16. By this arrangement, the above described logical function is performed.

Output lines $d$, $e$ and $f$ from AND gates 15, 16 and 17 are connected to the inputs of a sequence register 18 having nine storage elements, illustrated as flip flops, numbered 19 through 27 and three inverters numbered 28, 29 and 30 which have their inputs connected to output lines $d$, $e$ and $f$, respectively. Flip flops 19 through 27 are preferably of the J-K type, such as the microelectronic type manufactured by Fairchild, Model No. PL-945.

Figure 2:
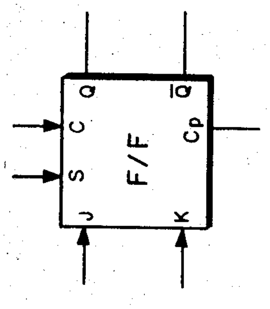
FIG. 2 is a typical logic element used in the embodiment illustrated.

FIG. 2 illustrates a logic diagram of a typical J-K flip flop having J-K inputs and Q and $\bar{Q}$ outputs, with a clock pulse input designated by the letter $C_p$ and direct set and clear inputs designated by the letters S and C, respectively.

The J inputs of flip flops 21, 24 and 25 are connected to the outputs of inverters 28, 29 and 30, respectively, and the K inputs of these flip flops are connected to the inputs of these same inverters. The Q output of flip flop 21 is connected to the J input of flip flop 20 and the $\bar{Q}$ input is connected to the K input. Similarly, the Q output of flip flop 20 is connected to the J input of flip flop 19 and the $\bar{Q}$ output of flip flop 20 is connected to the K input of flip flop 19. Flip flops 22 through 25 are similarly connected so as to provide three three-stage shift registers. Flip flops 19 through 21 are designated the "*a* register", flip flops 22 through 24 the "*b* register" and flip flops 25 through 27 the "*c* register". The Q outputs of flip flops 19 through 27 are connected to a decoder display 31 for displaying the decoded signal from the sequence register in the form of a parallel pure binary word, that is, a parallel combination of logical "1's" and "0's" with no weighting. This decoder display is typically a plurality of simple three-input AND gate logic arrangements whereby 27 different displays are possible.

The clock pulse inputs, $C_p$, of flip flops 19 through 27 are connected to a shift pulse generator 32 which derives its input from the three output lines *d*, *e* and *f* of the frequency decoder 11. The function of the shift pulse generator 32 is to generate the shift pulses of a selectable duration if the input pulses meet certain established criteria, as determined by the components in the shift pulse generator circuit. To perform this function, the shift signals are connected to a three-input OR gate 33 which has its output connected to a two-input AND gate 34, called a shift gate. Also connected to this output of the OR gate 33 is a capacitor 35 which, in addition to suppressing transient noise signals, requires that the output of the OR gate 33 have a pulse width greater than the time required to charge capacitor 35 before shift gate 34 will pass a signal. Connected between the output of the shift gate 34 and a source of bias voltage, V, is a resistor 36a which functions as a load for the shift gate. The output of the AND gate 34 is also connected to a differentiating network 37 composed of a capacitor 37*a* and a resistor 37*b*. The function of the differentiator network is to differentiate pulses greater than a particular pulse width (as determined by the time constant of the network) so that all differentiated pulses issuing therefrom have the same characteristics. The output of the differentiator network 37 is connected to a one-input AND gate 38 which provides a shift pulse (having a pulse width determined by the time constant of the differentiator network 37) to the clock inputs of flip flops 19 through 27 each time a signal issues from the shift gate 34. The differentiator 37 and AND gate 38 provide a one-shot multivibrator function and could obviously be replaced with such an element. A resistor 36*b* is connected between the output of the AND gate 38 and the voltage source, V, and functions as a load for the AND gate. A better understanding of how the shift pulse generator 32 performs its function will be had when described hereinafter in connection with the overall matrix operation.

The shift pulse issuing from the pulse shaper 32 performs two functions: first, to clock the appropriate steering signal from the input decoder 11 into one of three registers (*a*, *b* or *c*) of the sequence register 18, and second, to initiate the operation of a timing control 39 which provides an output pulse at a desired time to clear the sequence register 18. To provide the clearing signal, the timing control 39 inverts the shift signal from the AND gate 38 in an inverter 40 which has its output connected to one input of a two-input AND gate 41. The output of the AND gate 41 is connected to the input of a one-input AND gate 42 which has a differentiator network 43 comprising a capacitor 43*a* and a resistor 43*b* at its output. The output of the differentiator network 43 is fed back to the second input of the two-input AND gate 41 so that a one-shot multivibrator function is provided. In this way, the pulse width of the signal issuing from the AND gate 41 is determined by the time constant of the differentiator network 43. The output of the AND gate 41 is also connected to an inverter 44 which has its output connected to one input of a two-input OR gate 45. The second input of the OR gate 45 is derived from serially connected inverters 46 and 47. The input of inverter 46 is connected to one end of a resistor 49 which has its other end connected to the voltage source, V. The input of the inverter 46 is also connected to one end of a capacitor 50 with the other end thereof connected to a reference potential so that an input signal will be applied to the OR gate 45 each time the voltage source, V, is turned on. By this arrangement, an initial reset for the matrix is provided. The output of the OR gate 45 is connected to a differentiator network 51 having a capacitor 51a connected between the output of the OR gate 45 and one input of a two-input AND gate 52 and a resistor 51b connected between the same input of AND gate 52 and the voltage source, V. The time constant of the differentiator network 51 determines the pulse width of the signal issuing from the AND gate 52. The second input to the AND gate 52 is connected to a push button reset 53 which normally applies a logical "1" to the gate input, but when depressed, applies a logical "0", thereby causing a logical "0" to appear at the output of gate 52 and the output of an AND gate 54 connected thereto. This logical "0" clears or resets the sequence register 18.

To insure that not more than three sequential pulses are read into the sequence register, the $\bar{Q}$ outputs from the last stage of each register are connected to a three-input OR gate 55 which has its output connected to an inverter gate 56. The signal developed at the output of the inverter 56 when a third pulse has been received by the matrix is routed back to the shift gate 34 to inhibit the passage of any further shift signals during the remainder of that particular binary sequence. A press to test button 57, connected to the direct set inputs, S, of all the flip flops, is utilized to provide a set signal to all the flip flops of the sequence register so that all the indicators on the decoder display 31 can be tested.

The operation of the invention will now be described with reference to FIG. 3 which illustrates typical wave shapes associated with the embodiment of FIG. 1. When the voltage source, V, is first turned on, an initial reset pulse will be generated by resistor 49 and capacitor 50. This pulse will be coupled through inverters 46 and 47 to OR gate 45, and as described previously will generate a clearing signal for the shift register 18 so that all the flip flops in the register have a logical "0" at their Q output. After this operation, the matrix is ready to receive binary signals at its input. If desired, the press to test button 57 may be depressed to check the indicators on the decoder display 31.

Figure 3:
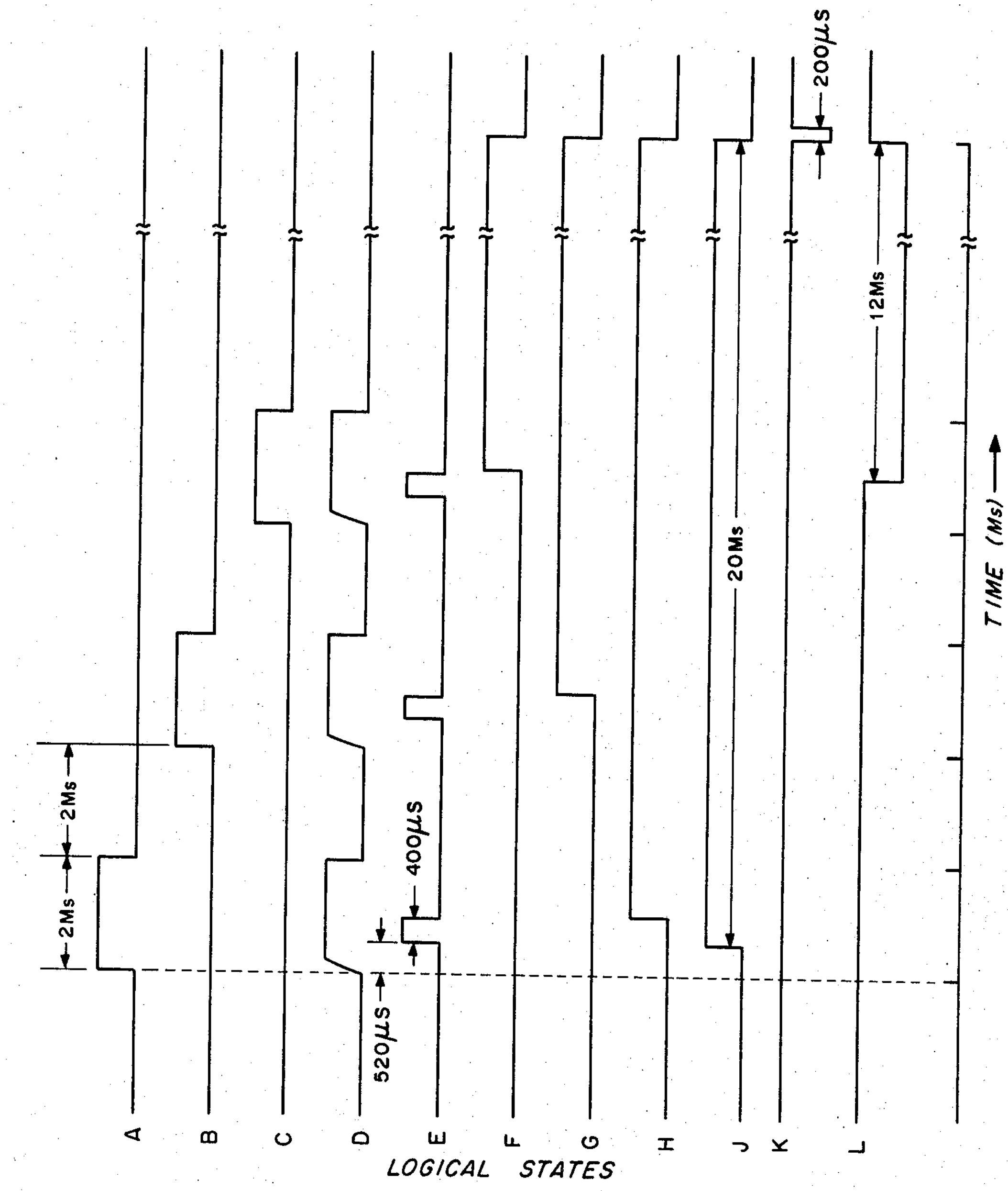
FIG. 3 is a timing diagram of the wave shapes which appear at various identified points in the embodiment illustrated.

Assume, for purposes of illustration only, that the input data to the input decoder 11 are three sequential pulses of 2 millisecond duration spaced apart from each other by 2 milliseconds as illustrated on lines A, B and C of FIG. 3. Considering first the input signal appearing on the C input line, it will be applied to AND gate 17 which as a result of inputs a and b being in the logical "0" condition will have logical "1's" at the other two inputs so that when the input line C reaches the logical "1" condition, a logical "138 will issue from AND gate 17 and will be applied to the inverter 30. In a similar manner, the sequential pulses issuing from AND gates 16 and then 15 will be applied to inverters 29 and 28, respectively. The outputs of inverters 28, 29 and 30 will then be steering signals for flip flops 21, 24 and 27, respectively. Each of the outputs from the input decoder 11 are also coupled to the OR gate 33 and will provide a serial output as illustrated on line D of FIG. 3. It will be noted that each shift pulse has a slow rise time which is attributed to the integration by capacitor 35. In this particular example, the value of the capacitor is such that the pulse issuing from the OR gate 35 must be greater than 520-microseconds ($\mu$S) or no pulse will issue therefrom. This signal is coupled to the shift gate 34, through the differentiator network 37 to the AND gate 38 from which the shift pulses, illustrated in line E of FIG. 3, issue. As can be seen on line E, a 400-microsecond shift pulse issues with each input pulse; the duration of the pulse, as previously described, is determined by the time constant of the differentiator network 36. Accordingly, at the end of the first shift pulse, the logical "1" steering signal appearing at the input of flip flop 27 is clocked into that flip flop. With the occurrence of the second shift pulse, the signal stored in flip flop 27 is shifted to flip flop 26 and the signal appearing on the b input line is clocked into flip flop 24. The third shift pulse shifts the signal stored on flip flop 26 to flip flop 25, shifts the signal stored on flip flop 24 to flip flop 23 and clocks into flip flop 21 the signal appearing on input line a. In this way, the signal appearing on input line c is stored in flip flop 25, the signal appearing on input line b is stored in flip flop 23 and the signal appearing on line a is stored in flip flop 21. The Q outputs of flip flops 25, 23 and 21 are illustrated on lines F, G and H of FIG. 3, respectively. By simple AND gating of the Q outputs from these three flip flops in the decoder display 31, an indicator light can be made to light, thereby displaying the decoded signal.

To insure that no additional pulses are permitted to enter the sequence register, the $\bar{Q}$ output from flip flops 19, 22 and 25 (normally logic "1's") are OR gated in the OR gate 55 and the output signal therefrom fed back through the inverter 56 to inhibit the shift gate 34 from issuing any further shift pulses. The inhibit function is provided by changing the normally logical "1" output from the inverter 56 to a logical "0", thereby preventing the shift gate 34 from being influenced by any signal issuing from the OR gate 33. This signal condition is illustrated on line L of FIG. 3.

As described previously, the first shift pulse issuing from the shift pulse generator 32 is used by the timing control 39 to generate a 20-millisecond time period, illustrated on line J of FIG. 3, which establishes the basic operating cycle time of the matrix. From this signal, a clearing signal, illustrated on line K, is generated which resets the sequence register. Accordingly, if three input signals are not processed within the 20-millisecond time period, no output will appear from the decoder display 31 and the sequence register will be reset and ready for the next input sequence.

It is to be understood, of course, that although the invention is described with reference to the specific embodiment illustrated, those skilled in the art could obviously make modifications thereto without departing from the spirit and scope of the invention. For example, it is contemplated that the matrix could by changed from a 3 × 27 matrix to a 2 × 8 matrix or 4 × 64 or other combination depending upon the number of input lines and the number of logical states per input line. Accordingly, the invention disclosed enables the decoding of *n* sequential events each having *m* different states without the need for an internal clock or a data message preamble.

Many other modifications and variations of the present invention are also possible in light of the above teachings. It is therefore, to be understood that within the scope of the appended claims, the invention may be practiced otherwise than as specifically described.

We claim:

1. A matrix for decoding a sequential binary word defined by *n* input signals each having *m* different binary states wherein *n* and *m* are integers and the number of possible decoded combinations, *M*, is defined by $M=n^m$, said matrix comprising:
- first means to generate shift pulses in response to said binary word;
- an input decoder adapted to receive said binary word and provide steering signals in response thereto;
- *m* storage registers each connected to receive said shift pulses and having *n* storage elements for storing said signals, said registers providing a decoded parallel binary word readout;
- second means to provide a clearing signal applied to said registers after a predetermined time from the start of the binary word;
- third means to inhibit said first means from generating said shift pulses after said binary word is stored in said registers;
- fourth means to display said decoded parallel binary word readout; and
- fifth means to inhibit said first means from generating said shift pulses unless said steering signals are greater than a predetermined pulse width.

2. A matrix for decoding a sequential binary word defined by *n* input signal each having *m* different binary states wherein *n* and *m* are integers, said matrix comprising:
- input means adapted to receive said binary word to provide steering signals;
- generator means to generate shift pulses in response to said steering signals;
- register means to receive said steering signals and said shift pulses to provide a decoded parallel binary word readout;
- timing means responsive to said shift pulses for issuing a clearing signal for recycling said resister means after a predetermined time from the start of said binary word; and gating means responsive to said register means to inhibit said generator means from generating said shift pulses unless said steering signals are greater than a predetermined pulse width.

3. A matrix as recited in claim 2 wherein said register means comprises:

*m* storage registers each having *n* storage elements for storing said steering signals.

4. A matrix as recited in claim 3 further comprising:

display means responsive to said register means for displaying said parallel binary word.

5. A matrix for decoding a sequential binary word defined by *n* input signals each having *m* different binary states wherein *n* and *m* are integers, said matrix comprising:

an input decoder for receiving the input signals of the binary word and providing in response thereto equivalent steering signals unless more than one input signal of the binary word are simultaneously received thereby;

generator means connected to receive said steering signals for generating a shift pulse in response to each said steering signal received; and means connected to receive said steering pulses and said shift pulses to provide a decoded parallel binary word readout.

6. A matrix for decoding a sequential binary word defined by *n* input signals each having *m* different binary states wherein *n* and *m* are integers, said matrix comprising:

first means for receiving the binary word and generating shift pulses in response to said binary word, said first means including an input decoder adapted to receive said binary word and provide steering signals in response thereto, said input decoder means including logic means for providing said steering signals unless more than one of the input signals in said binary word are received simultaneously; and

*m* storage registers connected to receive said shift pulses and said steering signals and each having *n* storage elements for storing said steering signals as a decoded parallel binary word readout.

* * * * *